INVENTOR
ADOLPH H. F. SCHAAR
BY G. H. Strong
HIS ATTORNEY.

A. H. F. SCHAAR.
ELECTRICAL SELECTIVE MECHANISM.
APPLICATION FILED NOV. 1, 1909.

1,159,714.

Patented Nov. 9, 1915.
8 SHEETS—SHEET 2.

WITNESSES:
R. S. Berry
F. E. Maynard

INVENTOR
ADOLPH H. F. SCHAAR
BY G. H. Strong
HIS ATTORNEY.

A. H. F. SCHAAR.
ELECTRICAL SELECTIVE MECHANISM.
APPLICATION FILED NOV. 1, 1909.
1,159,714.
Patented Nov. 9, 1915.
8 SHEETS—SHEET 4.
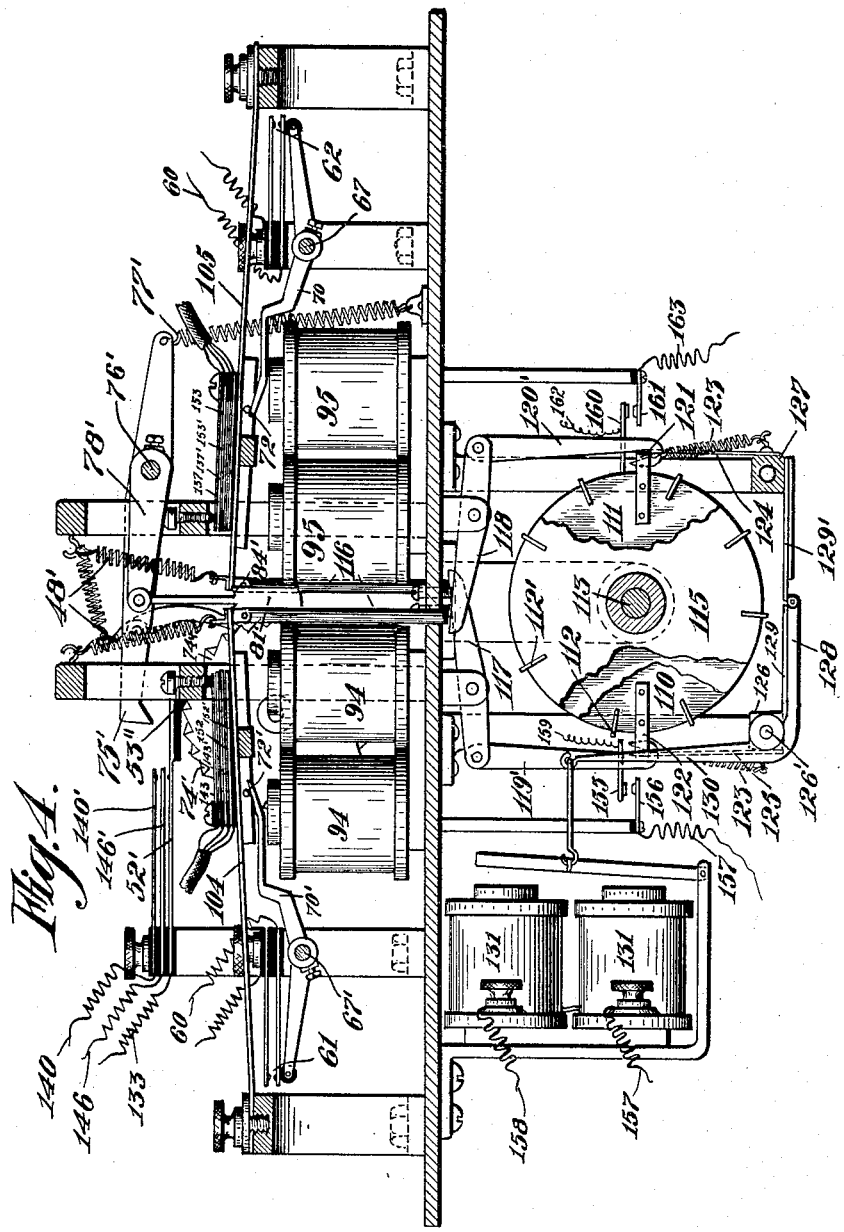
WITNESSES:
INVENTOR,
ADOLPH H. F. SCHAAR
HIS ATTORNEY.

A. H. F. SCHAAR.
ELECTRICAL SELECTIVE MECHANISM.
APPLICATION FILED NOV. 1, 1909.
1,159,714.
Patented Nov. 9, 1915.
8 SHEETS—SHEET 5.
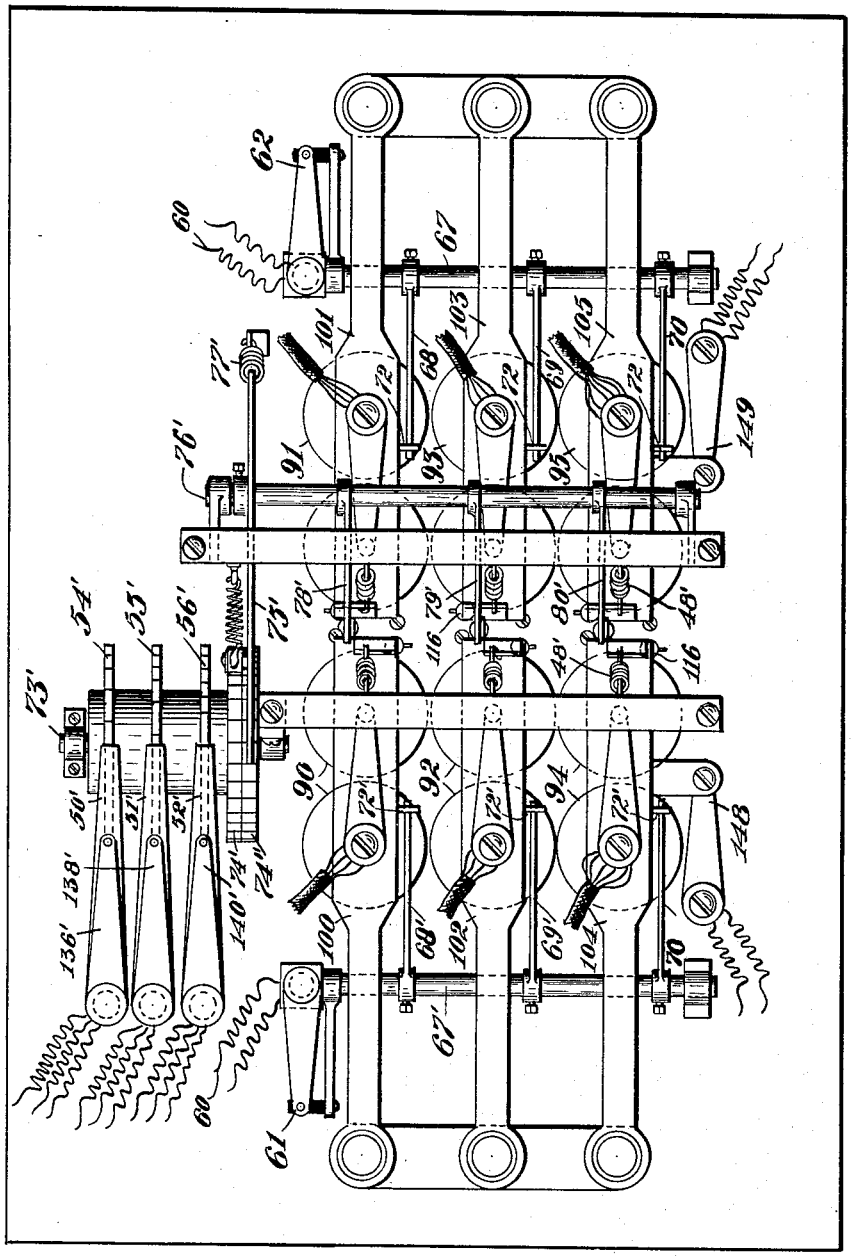
WITNESSES:
INVENTOR
ADOLPH H.F. SCHAAR
BY
HIS ATTORNEY.

A. H. F. SCHAAR.
ELECTRICAL SELECTIVE MECHANISM.
APPLICATION FILED NOV. 1, 1909.
1,159,714.
Patented Nov. 9, 1915.
8 SHEETS—SHEET 6.
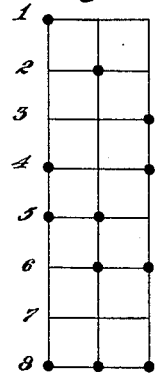
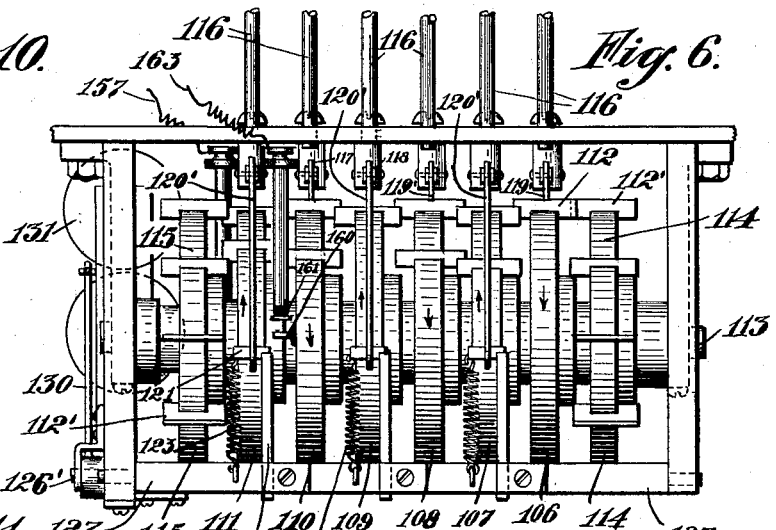
WITNESSES:
INVENTOR
ADOLPH H.F. SCHAAR
BY
HIS ATTORNEY.

A. H. F. SCHAAR.
ELECTRICAL SELECTIVE MECHANISM.
APPLICATION FILED NOV. 1, 1909.

1,159,714.

Patented Nov. 9, 1915.
8 SHEETS—SHEET 7.

WITNESSES:

INVENTOR
Adolph H. F. Schaar
BY G. H. Strong.
HIS ATTORNEY.

A. H. F. SCHAAR.
ELECTRICAL SELECTIVE MECHANISM.
APPLICATION FILED NOV. 1, 1909.
1,159,714.
Patented Nov. 9, 1915.
8 SHEETS—SHEET 8.
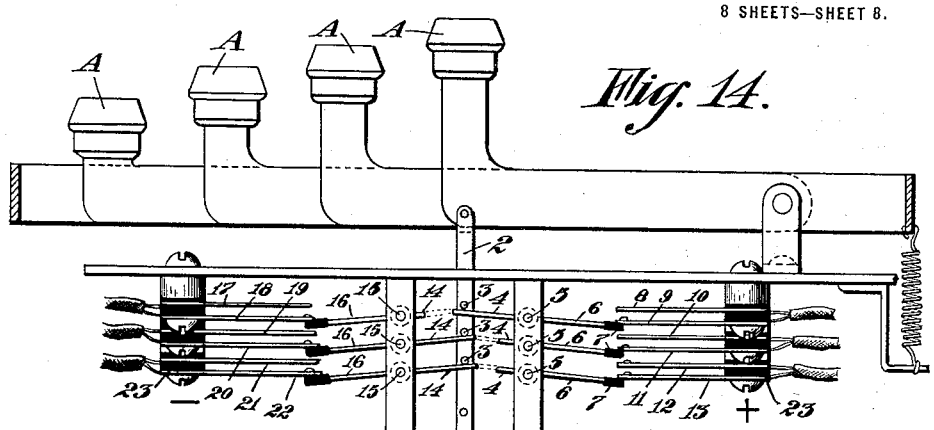
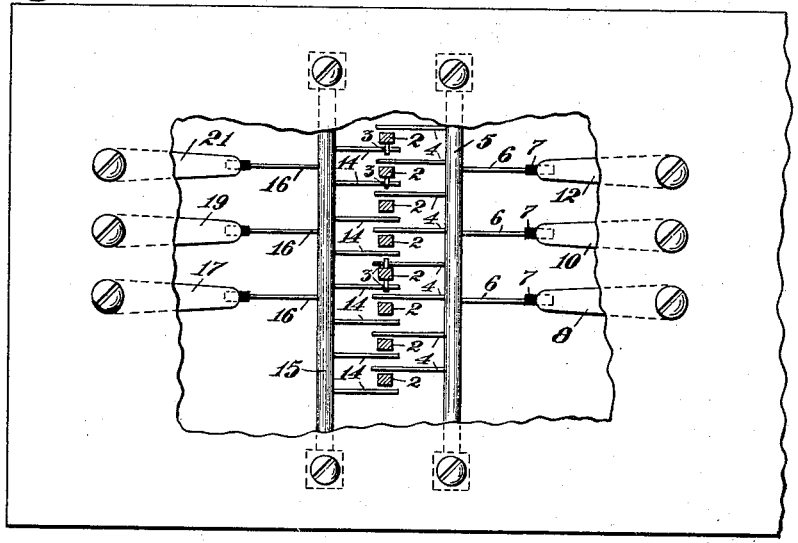
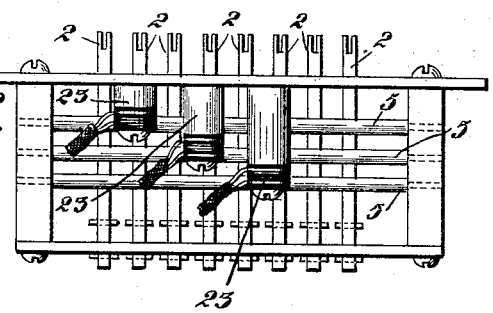
WITNESSES:
INVENTOR
ADOLPH H. F. SCHAAR
BY G. H. Strong.
HIS ATTORNEY.

UNITED STATES PATENT OFFICE.

ADOLPH H. F. SCHAAR, OF OAKLAND, CALIFORNIA, ASSIGNOR OF ONE-HALF TO HARRY W. BISHOP, OF OAKLAND, CALIFORNIA.

ELECTRICAL SELECTIVE MECHANISM.

1,159,714.  Specification of Letters Patent.  Patented Nov. 9, 1915.

Application filed November 1, 1909. Serial No. 525,610.

*To all whom it may concern:*

Be it known that I, ADOLPH H. F. SCHAAR, citizen of the United States, residing at Oakland, in the county of Alameda and State of California, have invented new and useful Improvements in Electrical Selective Mechanism, of which the following is a specification.

The object of my invention is to provide means for selecting a number of points in one station, or a different number of points in one apparatus in a station, or a different number of stations; over a single telegraph wire.

I make use of an ordinary telegraph line, substituting my sending apparatus for the Morse key, and my receiving apparatus for the receiving sounder. I also substitute polarized relays where the common relays are in use.

My present form of selector system requires the use of a polarized relay because negative and positive impulses are used and sent out over the telegraph wire to operate the receiving apparatus.

The invention consists of the parts and the construction and combination of parts as hereinafter more fully described and claimed, having reference to the accompanying drawings, in which—

Figure 1:
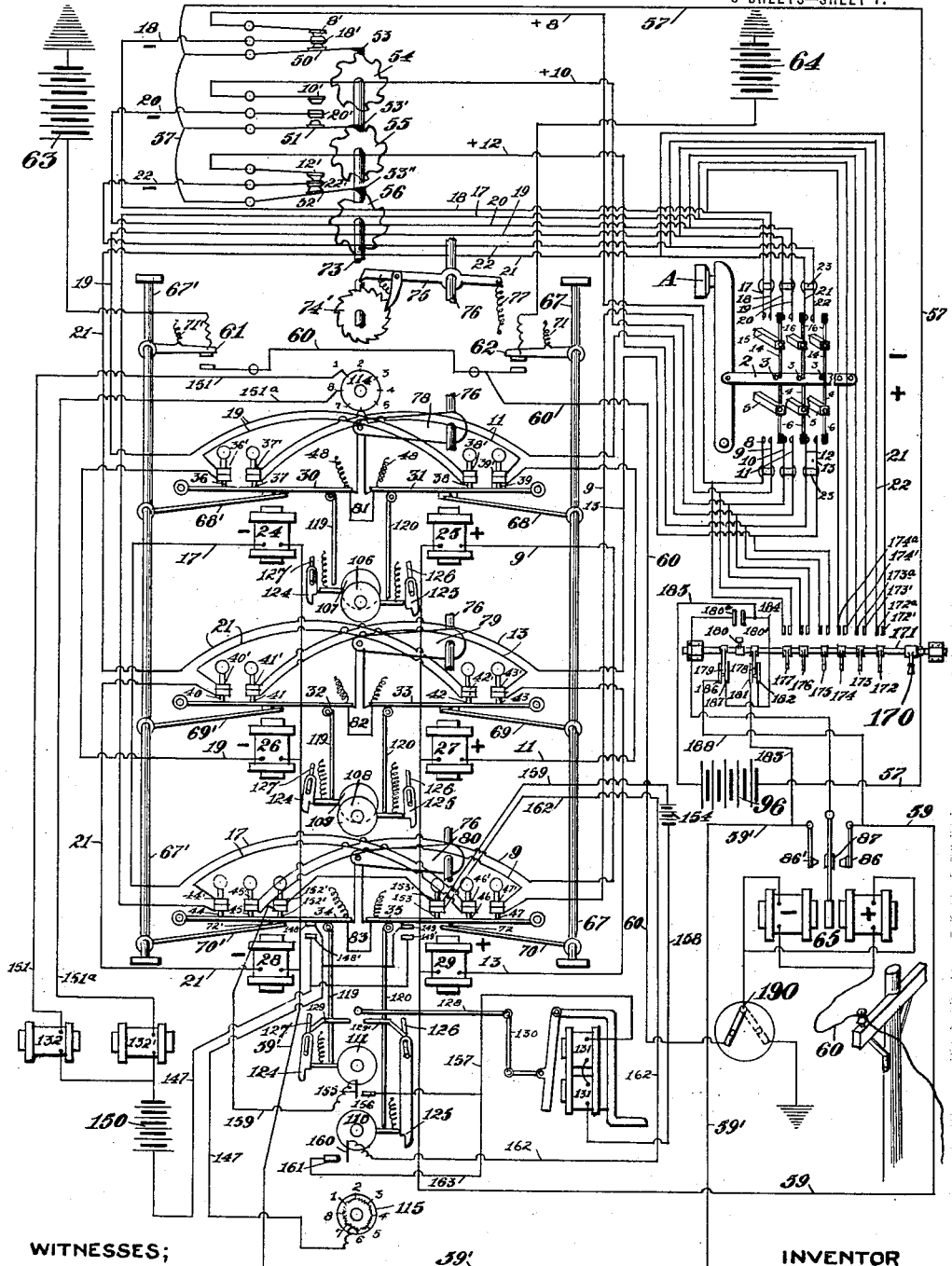
Figure 2:
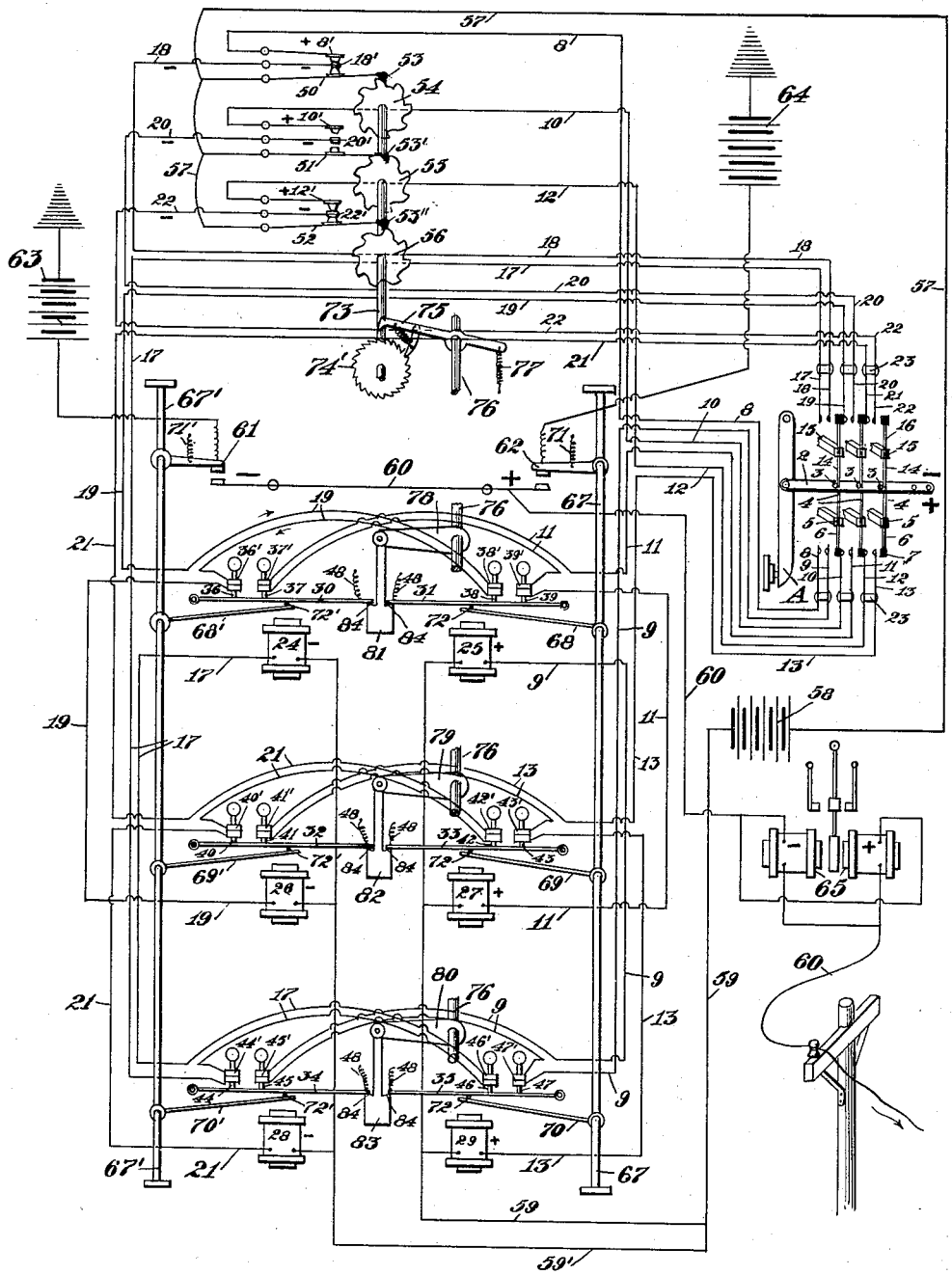
Figure 3:
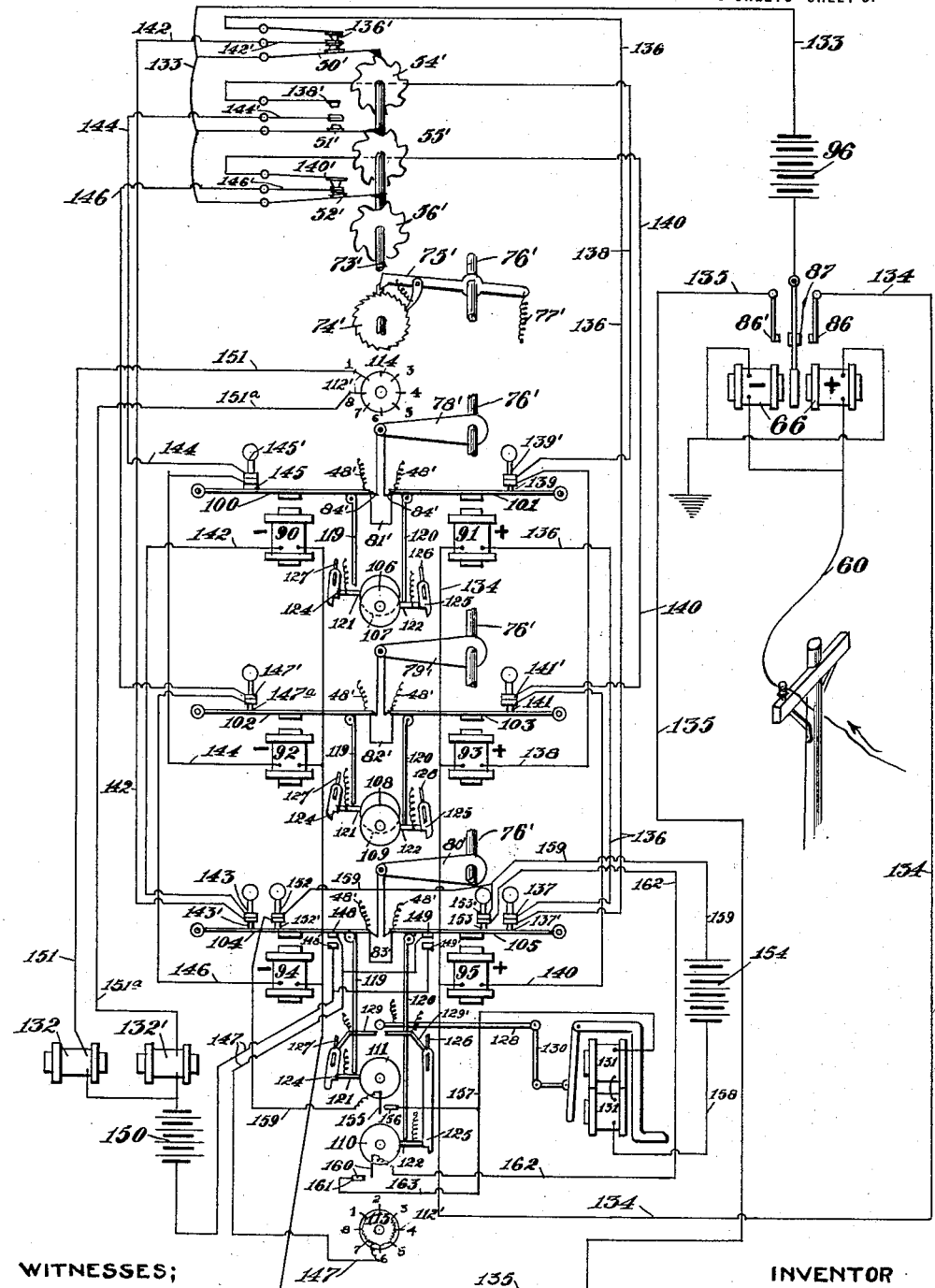
Figure 12:
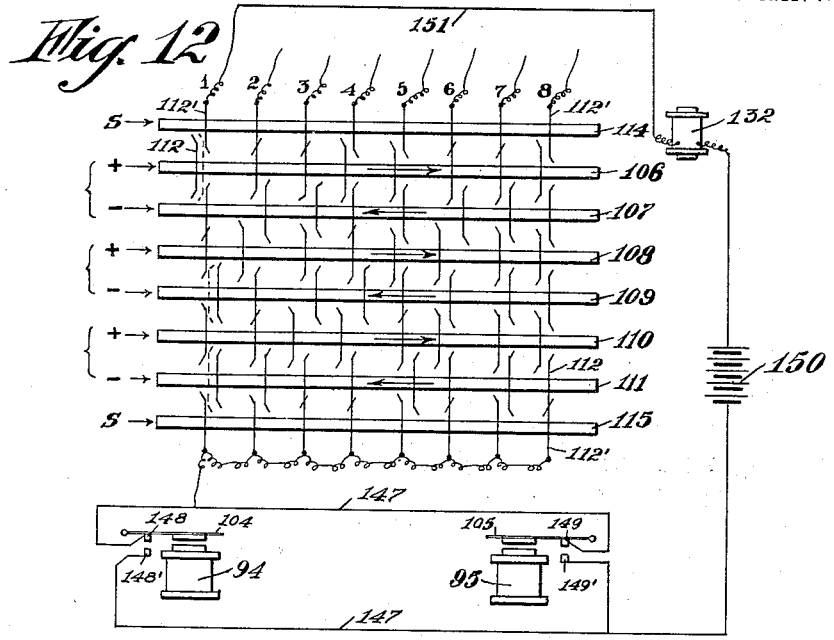
Figure 13:
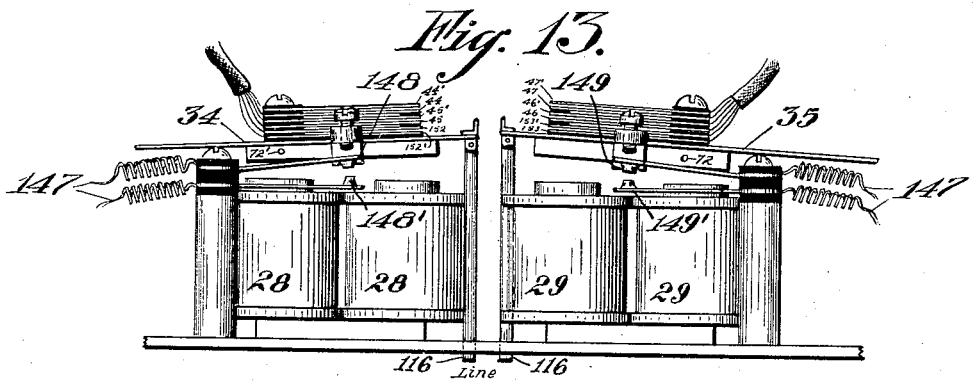
Figure 17:
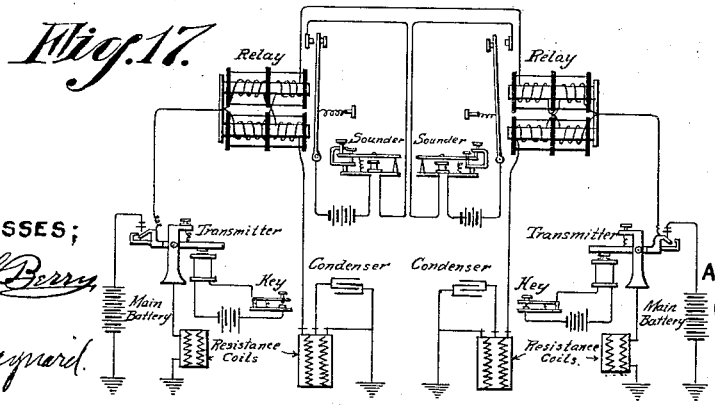

Figure 1 is a diagrammatic view of the mechanism. Fig. 2 is a diagram showing the sending circuit of the mechanism. Fig. 3 is a diagram showing the receiving circuit of the mechanism. Fig. 4 is a cross-section of the device. Fig. 5 is a plan view of the same. Fig. 6 is a side elevation showing part of the receiving mechanism. Fig. 7 is an inverted plan view of same. Figs. 8 and 9 show the stationary disks. Figs. 10 and 11 are charts showing the arrangement of electrical impulses in a three and four impulse system. Fig. 12 is a diagrammatic view showing the relation of disks and their blades to each other. Fig. 13 is an end view of the last set of magnets diagrammatically shown in Fig. 1. Fig. 14 is an end view of the keyboard mechanism. Fig. 15 is a broken-away plan view of the keyboard circuit mechanism. Fig. 16 is a side elevation of same. Fig. 17 is a diagrammatic view showing an ordinary telegraph system on which my system is based.

In order to make clear certain following descriptions, I show, in Fig. 17, an ordinary telegraph line equipped for sending and receiving the Morse code.

The electrical current in present telegraph systems is derived from specially constructed dynamos which have taken the place of batteries formerly used. It is immaterial, however, by what means the electrical current is generated. To simplify explanations I will make use of batteries. In regular telegraph work one pole of the battery is grounded and the other pole is connected to one terminal of the Morse key, the other terminal of the Morse key is connected to the terminal of the relay, the other terminal of the relay connects to the outgoing wire, the end of the outgoing wire connects to the terminal of the receiving relay at the other end of the line, and the other terminal of the relay is grounded. When the Morse key is fully depressed and the contacts on the Morse key are closed, the line circuit is closed. The line current flows from the battery through the relay (in the sending station) along the telegraph wire to the receiving station and through the receiving relay into the ground, returning through the ground to the battery. Each time the line circuit is closed the electro-magnets on the relays are energized, and the armature on the relay is magnetically attracted toward the electromagnets, and a contact on the armature meets another contact on the relay. These two contacts close the electrical circuit which operates the sounder. The sounder circuit derives its electrical energy not from the line batteries, but from separate batteries in the receiving station. We have, therefore, one circuit which is called a line circuit, which tends to operate the relays when the Morse key is closed and opened, and another circuit, called the local circuit, which tends to operate the sounder when the relay contacts are closed and opened. It will therefore be seen that the line circuit does not directly affect the sounder. It only affects the relays, and the relay contact points in turn close and open an auxiliary circuit (the local circuit, as hereinbefore mentioned).

When it is desired to use negative and positive impulses a polarized relay is used, the armature on which is provided with a contact protruding on both sides of said armature, and electromagnets on each side of said armature. Contact points are also provided opposite both sides of the armature. When the armature is attracted by the one set of electro-magnets, a connection is made for the local circuit on that side; when the opposite electro-magnets attract the armature toward them, a connection is made on that side for the local circuit. A polarized relay is so mechanically and electrically arranged and constructed that although the line current, whether negative or positive in character, flows through both sets of electro-magnets and affects both sets of electro-magnets, the armature is drawn in one direction only, corresponding to the character of the electrical current flowing through the relay. It is common practice to refer to a polarized relay as having a negative and positive side. A negative impulse over the line wire affects the negative side; a positive impulse over the line wire affects the positive side.

From the foregoing explanations, it can be seen that any particular one of the two sets of contacts, on the polarized relay, can be closed by closing the line circuit and by using a proper character of current; that by closing the line circuit with the Morse key on a negative current, the relay contacts close on the negative side, connecting and closing the local circuit on that side; that by closing the line circuit with the Morse key on a positive current, the relay contacts close on the positive side, connecting and closing the local circuit on that side; and that the proper manipulation of the Morse key, and by using the necessary character of current, will correspondingly properly manipulate a sounder, the local circuit of which is closed on the negative side of the relay, and also a sounder, the local circuit of which is closed on the positive side of the relay. As I make use of an ordinary telegraph line, circuit and polarized relays, it will also be seen that I can operate my receiving mechanism at any distance at which it is possible to operate a sounder by the telegraph wire systems of today.

Instead of opening and closing the line circuit with the Morse key, I accomplish this same purpose with my sending apparatus. I also substitute my receiving apparatus for the sounder; the local circuit then operates my receiving mechanism instead of the sounder. If it is possible to send a message a distance of five thousand miles by the Morse system, it is possible for me to operate my mechanism the same distance.

I will now describe the method I employ to select any one of a different number of points over a single wire. While it is true I employ the regular telegraph circuit, it will be manifest that the ultimate results I accomplish are radically different from anything suggested or possible by the ordinary telegraph system.

I combine a number of electrical impulses to select one point; (by "point" I mean a letter or numeral or semaphore or signal or anything of a like nature to be reproduced or operated). For each point to be selected I use the same number of impulses, but the impulses are negative or positive, or negative and positive, in character. I combine an equal number of impulses for each point to be selected, but the arrangement of negative and positive impulses in each combination is different. For example: Say that I use three impulses for each particular point to be selected (see chart, Fig. 10); for point No. 1, the first impulse is positive, the second negative, and the third negative; (the dots represent positive impulses, and the blanks negative impulses); for point No. 2, the first impulse is negative, the second positive, and the third negative; for point No. 3, the first impulse is negative, the second negative, and the third positive; for point No. 4, the first impulse is positive, the second negative, and the third positive; for point No. 5, the first impulse is positive, the second negative, and the third negative; for point No. 6, the first impulse is negative, the second positive, and the third positive; for point No. 7, the first impulse is negative, the second negative, and the third negative; and for point No. 8, the first impulse is positive, the second positive, and the third positive.

We have now formed eight combinations, three impulses to a combination, and by changing the negative and positive character of the impulse we have formed eight different combinations. It will also be found that eight is the maximum number of combinations that can be formed using three impulses. It will also be found that by using four impulses to a point (see chart, Fig. 11) 16 different combinations can be formed; that by using five impulses to a point, 32 different combinations can be formed; by using six impulses to a point, 64 combinations; seven impulses to a point, 128; eight impulses to a point, 256; nine impulses to a point, 512; and ten impulses to a point, 1024.

It will be seen by the foregoing that adding one impulse to a previous combination, increases each successive combination two times the previous one.

As the number of points that can be selected over one wire is controlled by the number of impulses used to a combination, it is necessary to ascertain beforehand the maximum number of points it is desired to select, and then to make use of that particular combination which will give us the required number of selective points. If we require not more than eight selections, as, for example, for certain conditions of block signal systems, then we use No. 3 combinations; that means three impulses to every one selective point. If we require 1000 selections, we use No. 10 combination; that means ten impulses to every one selective point. If for telegraphic purposes, a six point selection would do, because the sixty-four selections possible would more than be sufficient to represent the various letters of the alphabet, numerals, punctuations, etc.

The foregoing explains what I term my combination scheme. I shall now explain how I make use of this scheme. In the following description I shall particularly refer to the sending and receiving of No. 3 combination impulses, and which gives us eight selective points:

Referring to Fig. 14 and Fig. 2, the keyboard of the sending apparatus is presumed to be provided with eight keys A, where it is desired to construct the keyboard to make the maximum number of selections possible with the No. 3 combination. I also arrange and construct the keyboard so that when a key is fully depressed it will close and open the line circuit three times in rapid succession. Furthermore, as the three impulses are negative or positive, or negative and positive in character, a key when fully depressed must close the line circuit so as to send out negative and positive impulses corresponding to one selection of the No. 3 combination; each key when fully depressed sending out three impulses, but of different selection.

In the drawings I have illustrated the invention as embodying the No. 3 combination system simply as a matter of convenience.

As shown in Fig. 14, each key A carries a plunger bar 2 having three laterally projecting pins 3. These three pins are designed to operate simultaneously three particular keyboard circuit closers which may control currents of negative character or positive character, or one or more negative currents and the rest positive. In any event it is to be understood that in the No. 3 combination system a plunger bar simultaneously operates only three keyboard circuit closers to close as many circuits. The keyboard circuit closers for what I shall merely term the positive side circuits, to simplify explanations, are represented by arms 4 secured to rock shafts 5, these rock shafts carrying oppositely projecting arms 6 which have insulated tips 7 arranged to close each a separate pair of keyboard contacts in a particular branch of the keyboard circuit which has six branch circuits, one for each pair of contacts. These contacts are arranged in pairs, one above the other, there being six pairs, three on the positive side and three on the negative side, and the contacts of the respective pairs for the positive side being represented by 8—9, 10—11, and 12—13. The keyboard circuit closers for the negative side are represented by arms 14 secured to rock shafts 15 with oppositely projecting arms 16 on the rock shafts working each a respective pair of contacts 17—18, 19—20, and 21—22. All these several contacts are suitably supported and insulated, as shown at 23, and the wires for the several branches of the keyboard circuit lead from these connections 23. For convenience of illustration, and to simplify the explanation, in Fig. 2 the keyboard branch circuit wires leading from these contacts 8—9, 10—11, etc., are given the same reference numerals as their contacts. The several arms 4—14 are engaged on top by certain of the pins 3 on the respective plunger bars 2. In Fig. 14, although there are six various keyboard circuit closers shown, three on the positive side and three on the negative side, it is understood that a single plunger bar 2 controls only three of these circuit closers; and in Fig. 14 the three circuit closers controlled by the one plunger bar are represented by one positive side keyboard circuit and two negative side keyboard circuits, which correspond to selection No. 1 of the No. 3 combination system, Fig. 10. Thus when the key A having the plunger bar 2, in Fig. 14 is depressed, this key will simultaneously close the keyboard contacts 8—9 on the positive side, and contacts 19—20, and 21—22 respectively, on the negative side, making simultaneous connection for three of the six branches of the keyboard circuit, these three circuits controlled by the automatic electrical switch mechanism with which the sending mechanism is provided, as will be hereinafter explained, closes and opens the line circuit three times in rapid succession, thereby closing and opening the relay contacts on the polarized relay three times, as the positive side keyboard contacts when closed permit the keyboard circuit to actuate a part or side of the sending mechanism which closes and opens a main line telegraphic transmitter 62 on a positive current, and the negative side keyboard contacts similarly close and open a main line telegraphic transmitter 61 on a negative current, all as will be more fully explained later. This key A consequently sends the first impulse positive, the second negative, and the third negative. And so when any one of the eight keys is fully depressed, it sends out a selected group of three electrical impulses over the line wire 60 corresponding to the key depressed.

The electrical sending mechanism consists, as represented graphically in Fig. 2, of six electro-magnets 24—25, 26—27, and 28—29 disposed in pairs 24—25, etc., forming three horizontal rows, one pair in a row. The three electro-magnets on the right, 25—27—29 I shall term positive side magnets, and they control a series of keyboard circuit switch mechanisms, hereinafter to be described, which in turn control the positive line circuit; and the three negative side magnets 24—26—28, so termed to simplify explanations, similarly control a series of keyboard circuit switch mechanisms which in turn control the negative line circuit. I shall accordingly speak of these magnets as positive side and negative side magnets, according to the positive and negative character of the line current represented by them. These six magnets 24—25, etc., have respective armatures 30—31, 32—33, and 34—35, and these several armatures carry pairs of respective contacts as follows: that is to say, armature 30 carries contacts 36—37; armature 31 carries contacts 38—39; armature 32 carries contacts 40—41; armature 33 carries contacts 42—43; armature 34 carries contacts 44—45; and armature 35 carries contacts 46—47. These several contacts 36—37, etc., coöperate with relatively fixed respective contacts 36'—37', etc. All the armatures are normally held away from their magnets when the latter are inert, by suitable means, as the springs 48; and the contacts 36—36', 37—37', etc., are normally in contact to close that branch of the keyboard circuit respectively controlled by them.

The energizing of the various electromagnets is effected by the following means: By reference to the diagrammatic view of the sending mechanism shown in Fig. 2, it is observed that the actuating key A is turned around from its position shown in Fig. 1, so that in Fig. 2 the so-called negative side is shown above the bar 2, and the so-called positive side is shown below; the wires 8—9, 10—11, and 12—13 operating the positive magnet side of the apparatus. By reference to this diagrammatic view of Fig. 2, it will be observed that the wires 18—20—22 on the negative side of the keyboard lead to a respective set of contacts 18'—20'—22'. It will also be observed that the wires 8—10—12 on the positive side of the keyboard lead to a respective set of contacts 8'—10'—12' which are opposed to the respective negative side contacts 18'—20'—22'. Also arranged with respect to the contacts 18'—20'—22' are spring switch members 50—51—52 which have insulated cam ends 53—53'—53'', these switch members 50—51—52 being operated to also close and open the keyboard circuit (in conjunction with contacts 36—36'—37—37'—38—38'—39—39', etc., and the keyboard contacts 8—9, 17—18, etc.) as will be later seen, by respective cam toothed ratchets 54—55—56. These several switch members 50—51—52 are arranged in parallel connected to a wire 57 which runs to the keyboard battery 58 which operates all three pairs of magnets used in sending No. 3 combination impulses. The other pole of the battery is connected through the wires 59—59' with one terminal of each of the six magnets 24—25, etc. The opposite terminals of these magnets are connected back to the keyboard as follows: The negative side magnets 24—26—28 have one of their terminals connected with a respective wire 17—19—21; and the positive side magnets 25—27—29 each have a terminal connected respectively with a wire 9—11—13. That is to say, the branch keyboard circuit through wire 17 from the keyboard will pass through contacts 44—44', 46—46' to its magnet 24, assuming, of course, that magnets 28—29 are deënergized. The branch circuit through wire 19 will pass through contacts 38'—38, 36'—36 to magnet 26, assuming, of course, that magnets 24—25 are deënergized. The branch circuit through wire 21 will pass through contacts 42'—42, 40'—40 to magnet 28, assuming, of course, that magnets 26—27 are deënergized. The same will be correspondingly true of the branch keyboard circuits passing through the positive magnet side wires 9—11—13, in so far as each one of these branch circuits must pass through a double set of respective contacts before going to its magnet, each circuit, of course, being successively interrupted if the magnets which control these particular contacts are energized at that time. Each circuit is also successively interrupted by the keyboard circuit controller ratchets 54—55—56.

The energizing of the magnets 24—25, etc., and the corresponding operation of the keyboard circuit controller ratchets 54—55—56 results in the closing of the main line circuit 60 which is either negative or positive, according as the transmitter 61 or 62 is negative or positive; these transmitters 61—62 connecting, respectively, with the negative and positive sources of electrical supply, as the main line batteries 63—64. The main line wire 60 has interposed in it a polarized relay 65 at the sending station, and a similar polarized relay 66 at the receiving station, Fig. 3. It will be understood, however, later herein, that each polarized relay 65 and 66 serves for receiving Fig. 1.

The positive transmitter 62 is controlled from the positive side magnets 25—27—29 by suitable means, as the following: The transmitter 62 comprises an arm on a rock shaft 67 carrying a series of arms 68—69—70 corresponding to each magnet 25—27—29. A spring 71 acts on the transmitter 62 normally to open it. Each of the arms 68—69—70 is engageable by a pin 72 on the respective armatures 31—33—35, so that when any one of the magnets 25—27—29 is energized, the pulling down of an armature will result in the rocking of the shaft 67 and the closing of the positive main line circuit 60. Similarly, the negative transmitter 61 is carried by a rock shaft 67' which has arms 68'—69'—70' similarly actuated on the energizing of any one of the negative side magnets 24—26—28.

The operation of the keyboard circuit controller ratchets 54, 55, 56 when any one of the magnets 24—25, etc., is energized, is accomplished as follows: These ratchets are all fixed on one shaft 73 which carries ratchets 74'—74" (Figs. 4–5), respectively, operative by a pawl and stop mechanism carried on a lever 75 secured to a rock shaft 76. A spring 77 acts on the arm 75 to lift it, so as to maintain it normally in position ready to actuate the ratchet 74', one tooth at a time, when the lever 75 is pulled down. The shaft 76 carries three arms 78, 79, 80, each of these arms having pivoted to it a respective latch members 81, 82, 83. These latch members 81, 82, 83 are arranged between the ends of the alined armatures 30, 31, 32, 33, 34, 35, and each of these latches has apposed hook members 84 underneath the armatures in such fashion that when any armature is attracted it will pull down on a respective latch 81, 82, 83, rock the shaft 76 and so actuate the ratchet 74' and consequently the keyboard circuit controller ratchets 54, 55, 56. It makes no difference which of the six magnets are energized, the rock shaft 76 will be rocked and the keyboard circuit controller ratchets 54, 55, 56 will all turn one tooth space in unison. The ratchets 54, 55, 56 and the teeth disposed on same are so positioned on the shaft that one of the ratchets, as 54, will always stop after a series of impulses corresponding to a selection has been sent, just as the cam end 53 of its switch 50 has been engaged by a tooth on the keyboard circuit controller 54, so as to prepare a connected path for that branch of the keyboard circuit between the several contacts 8'—18'—50. The keyboard branch circuit controlled by the circuit controller ratchet 55 will be broken, as shown, because the insulated cam end 53' rests in an interdental space on the ratchet 55. The next circuit controller ratchet 56 will have been turned so that the contacts 12', 22' and 52 are still closed, and the circuit controlled by them is held closed as long as a key on the keyboard is held fully depressed, thereby also holding the line circuit closed during that time. The current meanwhile cannot pass through contacts 8', 18', 50, as either one of the magnets 28, 29 is held energized as long as the key is held fully depressed and either set of contacts 44, 44' and 45, 45', or 46, 46' and 47, 47', is consequently open. The moment the pressure on the key is released, the magnet 28 or 29, as the case may be, is deënergized, and the contacts 44, 44' and 45, 45', or 46, 46' and 47, 47', are closed, when the respective armature is returned to its normal position. The insulating cam end 53" will then be just on the verge of dropping into the next notch, so that the slightest movement of the keyboard circuit controller ratchet 56 will disrupt the local circuit at 12', 22', 52, when a key is again depressed. The object of positioning the circuit controller teeth on the ratchets 54, 55, 56 in the manner described is simply to effect the proper timing of the sending of the impulses in sequence and not have them interfere with one another, and to enable the operator to hold the line circuit closed after the sending of the last impulse in the selection as long as desired.

It will thus be seen that the local circuit has a prepared closed connection at the circuit controller ratchet 54, and a slight connection at the local circuit controller ratchet 56 whenever the machine is at rest. But the prepared closed connection at the keyboard circuit controller ratchet 56 does not interfere with the sending of impulses in proper sequence, for the instant shaft 73 is acted upon, when a key is depressed, the cam end 53" on switch member 52 drops down, opening contacts 12', 22' and 52, instantly opening the branch circuit at that point. The first branch keyboard circuit that operates the sending mechanism 8—9 or 17—18, upon the depression of any key always passes through the contacts 8' and 50 or 18' and 50, the others operating in sequence. These circuit controller ratchets 54, 55, 56 operate independently and indifferently of the character of the current, whether negative or positive, and the current which comes in over the keyboard wire 57 and through the switch 50 may be either negative or positive in character. It is the particular negative or positive, or negative and positive side magnets energized and deënergized in proper sequence which determines the particular selective group of the combination. That is to say, if the first main line impulse is to be positive in character, the keyboard circuit will pass through 8, 8', 50, 57 to keyboard battery 58, wire 59, through magnet 25 to 9, through wire 9 and contacts 45", 45,—47', 47, back to 9 at the key A. If the first main line impulse is to be negative in character, the keyboard circuit will pass from the contact 17 at the keyboard through 18, 18', 50, 57, keyboard battery 58, keyboard wires 59 and 59', negative side magnet 24, wire 17, through contacts 46'—46, 44'—44, and thence back over the wire 17 to the contact 17 at the keyboard. This closing of either of these branch keyboard circuits consequently energizes the corresponding magnet 25 or 24.

If the negative side circuit is closed, which we have last traced, it will result in the energizing of the negative side magnet 24, the pulling down of its armature 30, and the simultaneous rocking of the shafts 67' and 76. The rocking of the shaft 67', as will be seen, will close the transmitter 61 on a negative current, resulting in the sending of a negative impulse over the main line wire 60. The rocking of the shaft 76 serves to actuate the ratchet 74' and turn the keyboard circuit controller ratchets 54, 55, 56 one tooth space. This turning of these circuit controllers one tooth space corresponds to the length of time of sending this first negative main line impulse. As the circuit controller ratchets 54, 55, 56 come to rest after this first actuation, the switch 50 rides off of the circuit controller ratchet 54, disrupting the keyboard circuit through 50; but correspondingly the switch 51 is closed, ready for the sending of the next main line impulse, which may be either negative or positive in character. If we say that this second impulse is positive in character, it will result as described before, in the closing of the transmitter 62 on a positive current, and the sending of a positive impulse over the main line to the receiving station. In the sending of this second and positive impulse, the positive side magnet 27 has been closed, the current from the battery 58 passing through wire 57, switch 51, contact 10', keyboard contacts 10—11, through wire 11, contacts 37', 37 and 39', through magnet 27 and wire 59, back to the battery (that is, if magnets 24 or 25 are deënergized); resulting again in the rocking of the rock shaft 76 and the turning of the circuit controller ratchets 54—55, 56, one tooth space, so that the switch 51 is opened and the key-board circuit through switch 52 is closed.

If the third impulse sent by the single depression of the key A is to be negative in character, the negative transmitter 61 will be closed and a negative impulse sent over the main line wire. In the sending of the third and negative impulse, the negative side magnet 28 has been closed, the current passing from the battery 58, through wire 57, switch 52, contact 22', keyboard contacts 22—21, wire 21, contacts 42'—42 and 40'—40, magnet 28 and wires 59' and 59, back to the battery; assuming that magnets 26 and 27 are deënergized. Thus it will be seen that each time the key closes a branch keyboard circuit through contacts 17, 18,—19, 20,—21, 22, or 8—9, 10—11, 12—13, it results in the simultaneous actuation of the rock shaft 76 with one or the other of the rock shafts 67—67' to send either a negative or a positive impulse over the main line, and to prepare one or the other of the key-board circuit branches controlled by the switches 51—52 to send the next impulse.

From the foregoing it will be seen that whenever a magnet 24—25, etc., is energized, the pulling down of its armature separates the corresponding double sets of contacts 36—36', 37—37', etc., carried by the respective armatures, so that whenever one magnet, as the negative side one 24, is energized, the circuit through its companion positive side magnet 25 and the succeeding negative side magnet is interrupted, so that there arises no confusion of positive and negative, or positive or negative impulses, but only a positive impulse or a negative impulse can be produced at one time.

It will be readily seen by the foregoing explanation that the keyboard circuits have no electrical connection with the line circuit, they serve exclusively to operate the electrical sending mechanism, the latter mechanism operating the two transmitters 61, 62, which are operated to close and open the line circuit, and that the impulses sent over the line circuit are the result of the successive closing and opening of the line circuit. It will also be readily seen that the two transmitters 61, 62, are operated to send out a combined number of electrical impulses with regard only to combining impulses negative or positive, or negative and positive in character and corresponding to a point to be selected, but with no regard to predetermining each or any impulse, with respect to length or potential. Each or any impulse in a combined number of impulses may be either of the dot or dash variety or both, of equal or variable strength, and different or like intervals of time may elapse between the sending of each or any impulse.

The impulses are sent out over the line wire accordingly and correspondingly to the rapidity with which the sending mechanism operates the two transmitters 61, 62 upon the depression of a sending key, and the electrical potential of each impulse is in accordance with the potential of the current used to operate the line circuit. The two transmitters, for example, may be operated alternately or respectively in rapid or slow or rapid and slow succession, sending impulses of different and varying length over the line circuit, and potential of the line current may vary during the sending of these impulses, but this will not interfere with the successful selection of the point it is desirable to select.

When manipulating the keyboard, no attention is paid to the selection; I number or name the keys from 1 to 8, inclusive, and depress that key, the number on which corresponds to the number of the selective point I desire to select at the other end of the line wire. Should I desire to select point No. 6, I fully depress key No. 6, etc. Should I require a greater number of selective points, sixty-four for example, I then use No. 6 combination; the keyboard being then provided with twelve sets of contacts, six for negative and six for positive. I also provide the keyboard with sixty-four keys. The impulse sending mechanism is then provided with six keyboard circuit controller ratchets and twelve magnets, six for operating the negative telegraphic transmitter, and six for operating the positive telegraphic transmitter. When any one of the sixty-four keys is now fully depressed, that key simultaneously closes six of the twelve sets of keyboard circuit closing contacts, making connections for six magnets on the impulse sending mechanism. These six magnets, corresponding to the keyboard contacts closed, are instantly operated by the keyboard circuit; the negative and positive telegraphic transmitters 61—62, or the negative or the positive telegraphic transmitters 61 or 62, as the case may be, sending out six impulses over the line wire. Where a still greater number of selective points are required, as already mentioned hereinbefore, a combination is used which contains the required number of selective points, and the keyboard contacts and the number of telegraphic transmitter magnets for each one of the two transmitters 61—62 and the circuit controller ratchets are correspondingly increased. The keyboard is also provided with the required number of keys.

The keyboard and sending mechanism will send that combination only for which it is constructed and intended.

Having explained how in a No. 3 combination system a three point selection is produced, and a succession of three impulses, either negative or positive, or a combination of positive and negative, are sent over the line wire 60, I will now describe the manner in which these impulses and selected groups of impulses are received and recorded at the other end of the line. The receiving mechanism and the circuits therefor are graphically represented in Fig. 3.

By reference to Fig. 3 is will be seen that the receiving mechanism is connected to the contacts 86—86′ of the receiving polarized relay 66. Whenever the contacts 86′—87 on the negative side of the receiving relay 66 are closed, the receiving mechanism's local circuit is closed through wires 133—135 (which correspond to wires 57—59′ of Fig. 2, as will be seen later) and one of a series of electro-magnets (90, 91, 92, 93, 94 and 95) in the receiving mechanism is energized. When said contacts are opened, the said local circuit is opened and the said one magnet is deënergized; when the relay contacts 86—87 on the positive side are closed, the said local circuit through wires 133, 134 (which correspond with 57—59, Fig. 2) is closed, and another magnet in said series of magnets is energized; when the positive contacts are opened the said local circuit is opened and the said magnet is deënergized; all as will more clearly appear hereinafter.

The receiving mechanism for receiving No. 3 combination selections is provided with six electro-magnets 90, 91, 92, etc.; the magnets being disposed in pairs, forming three horizontal rows similar to the magnets in the sending mechanism, Fig. 2. Whereas the six sets of three pairs of electro-magnets in the sending mechanism are used for sending impulses, the three pairs in the receiving mechanism are used to receive and register received impulses; but not directly from the line wire, but through the closing and opening of the polarized relay contacts 86—87 or 86′—87, the said contacts being closed and opened by the action of the said relay which is energized and deënergized by the closing and opening of the line circuit 60; the said closing and opening taking place at the keyboard end of the line through the telegraphic transmitters 61 or 62.

The receiving relay contacts 86′—87 on the negative side, when closed, register the negative impulses passing from the line wire through the relay 66; and the positive side of the relay contacts 86—87, when closed, register the positive impulses passing from the line wire through said relay. The negative and positive character of the line circuit is therefore only used to operate the polarized relay 66.

The source of electrical energy which operates the receiving mechanism is derived from a set of batteries 96, and it is immaterial on which side of the relay the relay contacts 86, 87, 86′ close, they close a local circuit flowing from this one said set of batteries 96, and all three pairs of magnets operated in the receiving of No. 3 combination impulses are operated by this one said set of batteries; but when the relay contacts 86—87 close on the positive side, the three sets of magnets 91—93—95 on the right hand side of the receiving mechanism are only affected; and when the relay contacts 86′, 87 close on the negative side, the three sets of magnets 90, 92, 94 on the left hand side of the receiving mechanism are only affected.

The electro-magnets 90—91, etc., in the receiving mechanism, as already mentioned, are disposed the same as those in the sending mechanism, and by and through the closing and opening of the relay contacts, on either or both sides of the relay, and also through the automatic electrical switch mechanism with which the receiving mechanism is also provided, the magnets in the receiving mechanism are energized and deënergized in the same order and the same successive order as the sending electro-magnets; the respective armatures 100—101, 102—103, 104—105 of said receiving magnets 90—91, etc., duplicating and repeating the same movements, and in the same successive order, the movements of the armatures 30—31, etc., on the sending mechanism; but the armatures of the receiving mechanism, instead of operating telegraphic transmitters like 61—62, operate respective circuit closing disks 106—107, 108—109, 110—111, constructed of hard rubber or fiber and provided with radial peripheral blades 112. Each respective armature 100—101, etc., on the receiving mechanism has a corresponding disk; as there are three magnets 91, 93, 95 for registering positive impulses, and three magnets 90, 92, 94 for registering negative impulses, there are six disks, three for positive (106, 108, 110) and three for negative (107, 109, 111). These disks are revolubly mounted on a shaft 113, and each disk can revolve a limited distance on said shaft, and independently of any other disk. By referring to Figs. 6, 7, 12 and 3, it will be seen that there are two end disks 114—115, making eight in all. The two extra disks, also constructed of hard rubber or fiber, one at each end of the shaft 113, are firmly secured to said shaft, and like the shaft, are stationary; they carry radial blades 112'.

One form of practical construction of a disk and the means for operating it from the magnets is illustrated in Fig. 4. Note: While Fig. 4 shows one practical means for actuating a disk, in the diagrammatic view, Fig. 3 (and Fig. 1) a very simple schematic form of disk actuator 119—120 is shown as attached direct to an armature 100—101, etc., and adapted to engage corresponding projections 121—122 on the disks; also a schematic form of catch 124—125 is shown in Figs. 3 and 1. These latter views simply represent the principle of the invention. To have attempted to reproduce the physical structures of Fig. 4 in the diagrammatic views Figs. 3 and 1 would have led to endless confusion.

Fig. 4 represents the lower or last sets of magnets 94—95, (diagrammatically shown in Fig. 3), the stationary end disk 115 being broken away to show the negative last movable disk 111, and the latter disk being broken away so as to show its complementary positive disk 110. In this view there is also shown a means for rotating the movable disks, these means comprising the following parts: Each armature 105—104 (and, of course, the same throughout the series of other armatures) carries a pivoted plunger rod 116 each of which is adapted to engage a corresponding lever 117—118; the lever 117 representing the positive side of the machine, and the lever 118 the negative side. Each of the levers 117—118 carries a respective actuating hook member 119'—120' which are adapted to engage with respective radial projections 122—121 on their corresponding disks 110—111. Energizing the set of magnets 94 will attract its armature 104, push down on its plunger rod 116, rock lever 118, pull up on hook 120', and so move disk 111 a space sufficient to cause one of its blades 112 to be brought into contact, or to be put into position to be brought into contact, with an adjacent blade on a movable disk, or with a blade 112' on a fixed end disk 114 or 115. If the positive set of magnets 95 is energized, the disk 110 will be given a short revolution in the opposite direction, to complete or prepare the alinement of the blades, as previously described. Each time a disk is revolved it is held securely in its new position against the tension of its spring 123 by means of a catch 124 or 125 which is arranged to spring in underneath projections 121 or 122, respectively. The negative disk catches 124 are fixed to a rock shaft 127, and the positive disk catches 125 are mounted on a rock shaft 126. Independently and pivotally attached to the protruding bearing 126' of shaft 126 is an arm 128 extending horizontally underneath the disks in the direction of the negative catches 124, which arm is engageable with projecting blades 129 and 129' which are respectively attached to the rock shafts 126 and 127 and are so operated on by the arm 128 that whenever the arm 130 (which forms a part of the arm 128) is operated outwardly by a set of releasing magnets 131, to the armature of which the arm 130 is connected, all the catches 124—125 will be rocked outwardly and oppositely from one another, so as to release all the disks and allow the springs 123 to return the disks into normal initial disconnected position. Thus it will be seen that each movable disk 106—107, etc., is so mechanically operated by its respective armature 101—100, etc., that whenever one of said armatures is attracted by its respective magnet 91—90, etc., the said armature carries its disk with it in its downward movement, revolving the disk a distance of say one-sixteenth of an inch; as the armatures 100—101, etc., of each pair of magnets oppose one another, the three disks 107—109—111 operated by the armatures on the left hand side revolve these disks to the left; the three disks 106—108—110 operated by the armatures on the right hand side revolve to the right. The contact blades 112, Fig. 7, are affixed and secured to the outer periphery of all the movable disks, and are so positioned that a successive step by step movement of three of the movable disks 106—111 will form a corresponding electrical connection between corresponding blades 112' on the stationary end disks 114—115 to close a second local circuit in which is disposed the sounder, or reproducer, or signal operating magnet 132 or 132', as the case may be. For the number 3 combination, which I am describing, each movable disk 106—111 is provided with eight contact blades 112. On the two stationary disks 114—115, Figs. 8–9, it will be seen that the eight contacts 112' are equally spaced, but on the six movable disks, Fig. 12, they are irregularly spaced. Now each movable disk, when revolved the full distance by its respective armature, is automatically locked and held in that position, the respective armature, however, returning to its normal position.

The manner of closing a circuit and working the several magnets successively in the receiving mechanism, Fig. 3, is substantially the same as that described in connection with the sending mechanism of Fig. 2.

By reference to Fig. 3, it will be observed that the armature carrying the contacts 87 of the polarized relay 66 is connected with one pole of battery 96. The other pole of the battery 96 is connected through a wire 133 in series with three switch members 50', 51', 52' which are alike in every particular, and are operated in every particular the same as their counterparts previously described in Fig. 2. These several switches are operated by the local circuit controller ratchets 54', 55', 56', which ratchets are fixed on a shaft 73' carrying a ratchet 74' operated from a rock shaft 76', which latter in turn is operated through one or the other of the pivoted latches 81', 82', 83' from the magnets 90, 91, etc.

The positive contact 86 on the positive side of the receiving relay 66 is connected by a wire 134 with one pole of each of the positive magnets 91, 93, 95. The negative contact 86' of the polarized relay is connected through the wire 135 with one pole of each of the negative magnets 90, 92, 94. The opposite poles of the several magnets 90, 91, etc., are connected back to battery 96 as follows: Magnet 91 has its pole, opposite to its connection with wire 134, connected to a wire 136, which passes down through the contact 137 and opposed contact 137 on armature 105 of magnet 95, thence to the positive side circuit closing contact 136' to switch member 50' and through wire 133 to battery 96; the circuit being closed and interrupted from time to time through the opening and closing of the contacts 87—86. Correspondingly, one pole of magnet 93 is connected with a wire 138 to a contact 139 on armature 101 of magnet 91, through opposed contact 139' to the positive side contact 138', thence, when the circuit is closed at that point, through switch member 51', wire 133, to battery 96. Magnet 95 has its other terminal connected by a wire 140 through contact 141 on armature 103 of magnet 93, through the opposed contact 141', through the positive side contact 140' to the corresponding switch member 52', when the circuit at that point is closed, and through wire 133 to battery 96. The corresponding terminal of the negative side magnet 90 is connected by a wire 142 through contact 143 with contact 143' on armature 104 of magnet 94, to the negative side contact member 142', thence through the switch member 50', when the latter is closed, through the wire 133 to battery 96, the circuit being closed and interrupted from time to time through the relay contacts 86', 87. The other local circuit wires 144—146 for the magnets 92—94 can easily be traced in a similar manner.

The circuit of the recording instrument, represented at 132 or 132', is closed through the operation of the disks 106—107, etc., in the following manner, the circuit being closed when the last magnet, either negative side or positive side, 94 or 95, is energized: One of the disks, as 115, is connected by a wire 147, which is in electrical connection always with all of its peripheral radial blades 112'. This wire 147 electrically connects the pair of contacts 148—149 on the armatures 104—105, respectively, of the two lowermost or last magnets 94—95. Opposed to each of these contacts 148—149 are respective contacts 148'—149', and which last named contacts connect by a continuation of the wire 147 with a battery 150 of the recording instrument circuit. It is understood that the recorder, or signal, or semaphore, simply diagrammatically represented by the element 132—132', is repeated for each of the eight selections. In the present case, I have simply shown two of these recording instruments connected with two of the insulated blades 112' on the fixed disk 114. It will be understood that in an eight point selection, such as has been described throughout, there would be eight of these recording instruments 132, etc., and eight line wires 151—151ª, etc., leading to a corresponding number of blades 112' on the disk 114. Since the circuit through the battery 150 and disks 114—115 can only be completed through the proper alinement of the blades on three of the intermediate movable disks 106—107, etc., it will readily be understood how my final selection through one or the other of the recording instruments 132, etc., is accomplished.

In order that the receiving mechanism will be ready to register new impulses, the movable disks must be released from their catches 124 or 125 and returned to normal position. This is accomplished as follows: If the disk 111 on the negative side is the last disk to be operated and locked, then a contact member 155 on disk 111 will engage another contact 156 which is connected by a wire 157 to one pole of the magnet 131, the other pole of the magnet 131 being connected by a wire 158 with the battery 154. The contact 155 is connected by a wire 159 through the contacts 152'—152 to the battery 154. The flying up of the armature 104 when magnet 94 is deënergized, providing magnet 94 is the one that has been last previously energized, will close the circuit through contacts 152—152' and thereby energize magnet 131 and operate the catches 124—125. If the last magnet in the series to be operated was the positive side magnet 95, then locking the disk 110 will cause a similar action to take place through a contact 160 on the movable positive disk 110 and a contact 161 and the circuit wires 163—157 and 162, the contacts 153—153' and wires 159—158, whose connections with the battery and magnet can easily be traced.

In order to illustrate the operation of receiving a message by the mechanism just described, we will assume that selection No. 2, Fig. 10, is sent over the line. The operator at the keyboard has depressed No. 2 key; the selection is, first impulse negative, second impulse positive, and third impulse negative. The first negative impulse passing through the receiving relay 66 closes the relay contacts 86'—87 on the negative side; the local circuit instantly energizing the magnet 90 on the left hand side in the receiving mechanism, or what I shall term the negative side magnet. The armature 100 on said magnet is instantly drawn down, moving its disk 107, for instance, with it, the disk being instantly locked and held in that position. As the negative line circuit was closed for an instant by the sending mechanism, and then again opened, the relay contacts on the negative side are similarly closed and opened, and when they opened, negative magnet 90 was deënergized, its respective armature instantly returning to its normal position. The second and positive impulse passing through the relay 66 closes the relay contacts 86—87 on the positive side, the local circuit instantly energizing the magnet 93 on the right hand side in the receiving mechanism, or what I shall merely term the positive side magnet. The armature on said magnet is instantly drawn down, moving its disk 108 with it, the disk being instantly locked and held in that position. The opening of the relay contacts deënergizes positive side magnet 93, its respective armature instantly returning to its normal position. The third and negative impulse closes the relay contacts on the negative side, the local circuit instantly energizing the last negative side magnet 94. The armature on said magnet is instantly drawn down, moving its disk 111 with it, the disk being instantly locked and held in that position.

The sending mechanism is so arranged that as long as a key A is held fully depressed, the keyboard circuit continues to energize that set of electro-magnets which last operated the telegraphic transmitter 61 or 62, either negative or positive. And the line circuit 60 is therefore held closed until the pressure on the said keyboard key is released.

The receiving mechanism is so arranged that as long as the line circuit is held closed, and which in turn holds either the positive or negative relay contacts closed, the electromagnet last energized continues to be energized, and this set may be either the last negative side magnet 94 or the last positive side magnet 95. As long as the last electromagnet is energized, its respective armature is held down, but the instant the line circuit 60 is opened, opening the relay contacts, on whichever side they are held closed, this last magnet 94 or 95 is deënergized; its armature immediately returning to its normal position. The instant the last armature, either 104 or 105, returns to said normal position, it closes the auxiliary local circuit 158—159. Now the last disk 110 or 111 that was moved and locked, either positive or negative, also made connection for this auxiliary local circuit, at 160, 161, or 155, 156; the contacts closed by the armature therefore completing the closing of said circuit. This last mentioned circuit energizes the unlocking electro-magnets 131, and its armature when attracted releases the disks held locked, the disks each by means of its spring 123, Fig. 4, instantly returning to their normal position, and the receiving mechanism is again in position to receive another selection.

Only three disks are moved and locked to each selection, but not the same three for each selection. The receiving mechanism sets three of the six disks correspondingly with the selection, and we therefore have each setting different and eight different settings, eight being the greatest number of settings that can be obtained with the No. 3 combination.

The contact blades 112 on the movable disks are so disposed that when any three disks 106—107, etc., are set and locked, one line of contact blades 112 are in connection, one blade contacting with the blade on another disk, and in a straight line, forming a complete electrical connection from the point of one blade 112' on one stationary disk 115, right through to the opposite blade 112' on the other stationary disk 114. If the setting of the movable disks, for example, was done by selection No. 1, then contacts No. 1, on the right disks, are contacting one with the other, forming a connected path at No. 1, for an electrical circuit, but no such a path is formed at Nos. 2, 3, 4, 5, 6, 7 and 8. If the setting of the disks was done by selection No. 5, then contacts No. 5, on the eight disks, are contacting, one with the other, forming a connecting path, for an electrical circuit at No. 5, but no such a path is formed for Nos. 1, 2, 3, 4, 6, 7 and 8, etc. Fig. 12 is a plane projection of the disks showing the method of arranging the contacting blades for a No. 3 impulse combination.

By connecting one pole of the battery 150 to the eight contact blades on one stationary disk, as 115, and then separately connecting eight electro-magnets 132, etc., one to each one of the eight contact blades on the other stationary disk 114, and then connecting the other terminal wire of each one of said electro-magnets 132, etc., to the other pole of the battery 150, we can energize any one of the eight magnets 132, etc., by depressing a key on the keyboard, corresponding to the electro-magnet 132—132′, etc., we desire to be energized. The instant this key is released the receiving mechanism is instantly unlocked and resets itself. It will be seen by the foregoing description that any one of these eight magnets 132, etc., can be operated at any distance to which it is possible to operate a polarized relay, and that the greatest distance possible is equal to the extreme distance to which the telegraph wire systems of today can send and receive messages.

When the receiving mechanism is to register a No. 6 combination, for example, then said mechanism is provided with six circuit controller ratchets and six pairs of electromagnets corresponding to 94—95, etc., twelve movable disks, and one stationary disk at each end; six sets of magnets and six disks for registering positive impulses, and six sets of magnets and six disks for registering negative impulses. Each of the fourteen disks is provided with sixty-four contact blades, when the maximum number of selective points obtainable with the No. 6 combination are required.

My selector system can be used for operating signals of various kinds and for various purposes; R. R. signals, for illustration:

It will also be seen that the polarized relay 66 is operated to successively or alternately close and open the two local receiving mechanism circuits with no regard to timing, length or potential of each or any impulse used in a combined number of impulses and received over the line circuit and that the polarized relay 66 is used to register electrical impulses received over the line circuit with regard only to the character of said impulses. It will also be manifest from the foregoing explanations that a current either negative or positive in character may be used to operate either the local sending or the local receiving mechanism circuits.

The receiving mechanism, through one of the connecting paths formed on said mechanism, can make electrical connection to operate a semaphore. My receiving mechanism, when used for this purpose, would be incased in a box and the box secured to the pole of the semaphore. The polarized relay would also be contained in said box. It is not necessary in this case to provide the disks with all the contact blades; one row of contacts only is necessary, and that row the one which makes connection for the electrical apparatus used to operate the semaphore. No. 1 semaphore, for example, would have a row of contact blades No. 1 on the disks, which set themselves in alinement when No. 1 key is depressed; No. 2 semaphore would have a row of contact blades No. 2 on the disks, which set themselves in alinement when No. 2 key is depressed, etc. Each relay in each semaphore is then connected to the line wire; whenever a key on the keyboard is depressed, each relay in each semaphore would operate, and in turn set and lock the disks in the receiving mechanism in each semaphore, but only one particular receiving mechanism would be set with the contact blades connecting one with the other, and that particular mechanism would be the one corresponding to the key depressed, as the other receiving mechanism's disks are not provided with that particular connection. Depressing key No. 1, for example, would operate eight relays, one in each one of eight semaphores, but only No. 1 semaphore arm would be raised; depressing key No. 5 would raise semaphore arm No. 5; and in each case, and no matter which one of the eight is operated, the semaphore can be held raised by keeping the respective key depressed. It can also be arranged that by depressing a key the respective semaphore operated and raised is automatically locked and held in such raised position. When the respective key is released, a second pressure on said key unlocks the semaphore, dropping it.

My selector system makes it possible to place signals certain distances apart all along a railroad line, the keyboard being placed in the despatcher's office. A despatcher can then, when depressing a key, stop a train anywhere along the line, for a semaphore five hundred miles distant can be as easily and quickly operated as though it were in the despatcher's office.

My selector system can also be used in connection with a printing device. The keys on the keyboard would then be lettered and numbered similar to those of a typewriter keyboard, and a combination would then be used which would give us the desired number of selections, one for each letter in the alphabet, eight for the numerals, etc. The disks on the receiving mechanism would be provided with the necessary number of contact blades, making connection to electromagnets 132, etc., which operate the typelevers on the typewriter. Depressing key "A" on the keyboard would make connection in the receiving mechanism to electromagnet A, which in turn would operate type-lever A, printing "A"; and so on with the remainder of the keys.

My sending mechanism can be constructed for sending purposes only, and my receiving mechanism for receiving purposes only; or the two mechanisms can also be combined, as shown in Fig. 1, (also in Figs. 4, 5 and 13), and by means of the switches 170—190 this combined mechanism can be set to receive or to send, as desired. When the sending and receiving mechanisms are combined, the same sets of electro-magnets 24—25 used for sending, are also adapted for receiving impulses.

As shown in Fig. 1, the switches 170—190 are set to send a message over wire 60. Switch 170 comprises an operating arm on a rock shaft 171, which latter carries three sets of contact arms; a set of contact arms 172, 173, 174, 175, 176 and 177 for preparing the receiving local keyboard circuits to receive a message; a set of negative and positive side contact arms 178—179 for preparing the sending circuit to send a message, and a contact arm 180 to close the local circuit and the relay contacts 86—86'—87, so that the local keyboard circuit can operate the receiving mechanism when impulses are received over the main line 60. Negative side contact 178 is adapted, when in the position shown in Fig. 1, to engage a pair of contacts 181—182 and connect one pole of the local battery 96 with one pole of the negative side magnets 24—26—28 through the following connections: contact 181, wires 183 and 59', to magnets; and contact 182, wires 184 and 185, to battery 96. Positive side contact arm 179 on rock shaft 171 engages at the same time a pair of contacts 186—187 to connect one pole of positive side magnets 25—27—29 with one pole of the battery 96, through the following connections: contact 186, wires 188 and 59, to magnets; and contacts 187, wires 184 and 185, to battery; but the circuit through the negative and positive side magnets is controlled from the keyboard, as previously described, and it is not necessary here to review the several circuits closed through the operation of the keys A of the keyboard. Suffice it to say that with switch 170 and contact arms 178—179 in the position shown in Fig. 1, the magnets are prepared to be actuated for sending purposes, and thereafter the sending operation is precisely as that described in connection with Fig. 2, the same reference numerals being employed in Fig. 1 (also in Fig. 13) that were employed in Fig. 2 for the sending part of the apparatus. For those parts of the receiving mechanism of Fig. 1 (also Fig. 13) which are used only for receiving purposes and are not interchangeable with the sending features, I employ the same reference characters employed in Fig. 3. Where circuits or parts in Figs. 2 and 3 are common both to the sending and receiving parts of the apparatus of Fig. 1, I have generally in Fig. 1 given them the same designating characters which they bear in the sending apparatus of Fig. 2. Thus circuits 133—134—135 of Fig. 3 are called 57—59—59', in Fig. 1, just as in Fig. 2, because they are one and the same in the apparatus of Fig. 1; except for the interposition of the switch 170 and its parts. Also in Fig. 1 (and Fig. 13) the magnets 90—91, etc., of Fig. 3 are designated as 24—25, etc.; also the circuit controller ratchets 54'—55'—56' of Fig. 3 are designated as 54—55—56 in Fig. 1, just as in Fig. 2; also wires 136—138—140—142—144—146 of Fig. 3 correspond to the respective wires 8—10—12—18—20—22 of Fig. 2, and are designated as 8—10—12, etc., in Fig. 1.

Switch 190, Fig. 1, connects the main line 60 to the ground when receiving, or to the telegraphic transmitters 61—62 and the batteries 63—64 when sending. In Fig. 1, the switch is set for sending a message and consequently is in circuit with the polarized relay and the telegraphic transmitters 61—62 and the batteries 63—64.

When sending a message the keyboard contacts 8—9—10—11—12—13—, 17—18—19—20—21—22 are normally open; but when receiving a message all these connections are normally closed. Therefore, to receive a message the shaft 171 is rocked to break the connections between the contact arms 178—179 and their respective contacts 181—182, 186—187, and to close the connections between the other contact arms 172—173—174—175—176—177—180 and respective pairs of contacts 172'—172ª, 173'—173ª, etc., 180'—180ª. Closing these connections prepares what were formerly the keyboard circuits of the sending machine, but which are now the local circuits of the receiving machine, so that a message may come in over the main line 60 and be recorded by the recording device 132, etc. Each pair of contacts, as 172'—172ª connects with a pair of keyboard wires, as 21—22, to make a closed connection between them for that particular circuit. Contact 180ª connects with the common contact 87 of the relay, and contact 180' connects with one pole of the battery 96; the other pole of this battery being connected with wire 57 (133, Fig. 3). Also the switch 190 is thrown into position shown in dotted lines, to ground one pole of the relay to complete the main line circuit 60. The various impulses of negative and positive character then received over the main line 60 are registered by the relay, and the final record made through the magnets 132—132', etc., all as described in connection with Fig. 3.

Thus I have provided an automatic relaying telegraphic or signaling apparatus with means for sending and receiving a selected group of electric, closely-successive impulses, all of similar sign, or of dissimilar sign, as all negative, all positive, or of both, and that the length of successive impulses and the strength thereof are indeterminate, save that they be of sufficient duration and potential to carry.

Having thus described my invention, what I claim and desire to secure by Letters Patent is—

1. In a telegraphic selective system, the combination of a single line circuit and a receiving and a sending mechanism, said receiving and sending mechanisms having respective means whereby a plurality of selections may be sent and received over the single line circuit, said line circuit including means for supplying said line circuit with electrical currents either negative or positive or negative and positive in character, said sending mechanism including a plurality of local sending circuits, means operated by said circuits which tend to successively close and open said line circuit and local means for supplying said local sending circuits with direct electrical currents which latter currents are either negative or positive in character but not both, said receiving mechanism including two local receiving circuits and local means for supplying said local receiving circuits with direct electrical currents which latter currents are either negative or positive in character, but not both, and other means operated electrically and directly by the said line circuit for successively or alternately closing and opening the said two local receiving circuits upon the successive closing and opening of said sending circuit and a switch with means for adapting the receiving local circuits as sending local circuits.

2. In a telegraphic selective system, the combination of a single line circuit and a receiving and a sending mechanism, said receiving and sending mechanisms having respective means whereby a plurality of selections may be sent and received over the single line circuit, said line circuit including means for supplying said line circuit with electrical currents either negative or positive or negative and positive in character, said sending mechanism including a plurality of local sending circuits, means operated by said circuits which tend to successively close and open said line circuit and local means for supplying said local sending circuits with direct electrical currents which latter currents are either negative or positive in character but not both, said receiving mechanism including two local receiving circuits and local means for supplying said local receiving circuits with direct electrical currents which latter currents are either negative or positive in character but not both, and other means operated electrically and directly by the said line circuit for successively or alternately closing and opening the said two local receiving circuits upon the successive closing and opening of said sending circuits and a switch with means for adapting the sending local circuits as receiving local circuits.

3. In a telegraphic selective system, the combination of a single line circuit and a receiving and a sending mechanism, said receiving and sending mechanisms having respective means whereby a plurality of selections may be sent and received over the single line circuit, said line circuit including means for supplying said line circuit with electrical currents either negative or positive or negative and positive in character, said sending mechanism including a plurality of local sending circuits, means operated by said circuits which tend to successively close and open said line circuit and local means for supplying said local sending circuits with direct electrical currents which latter currents are either negative or positive in character but not both, said receiving mechanism including two local receiving circuits and local means for supplying said local receiving circuits with direct electrical currents which latter currents are either negative or positive in character but not both, and other means operated electrically and directly by the said line circuit for successively or alternately closing and opening the said two local receiving circuits upon the successive closing and opening of said sending circuits and a switch with means for adapting the receiving local circuits as sending local circuits and vice versa.

4. In a telegraphic selective system, the combination with a single line wire, of sending and receiving mechanisms therefor, means for sending through the sending mechanism and receiving and selecting through the receiving mechanism of points or selections, each point or selection combining a plurality of electrical impulses of a negative and positive character, and a switch with means for adapting the receiving mechanism as a sending mechanism, said receiving mechanism having a series of shiftable contacts designed to be set so that a particular character may be electrically operated through a local receiving circuit, means to operate the shiftable contacts from the line circuit, and means to set said contact so that a particular character may be electrically operated from a local receiving circuit.

5. In a telegraphic selective system, the combination with a single line wire, of sending and receiving mechanisms therefor, means for sending through the sending mechanism and receiving and selecting through the receiving mechanism of points or selections, each point or selection combining a plurality of electrical impulses of a negative and positive character, and a switch for adapting the sending mechanism as a receiving mechanism, said receiving mechanism having a series of shiftable contacts designed to be set so that a particular character may be electrically operated through a local receiving circuit, means to operate the shiftable contacts from the line circuit, and means to set the said contact so that a particular character may be electrically operated from a local receiving circuit.

6. In a telegraphic selective system, the combination with a single line wire, of sending and receiving mechanisms therefor, means for sending through the sending mechanism and receiving and selecting through the receiving mechanism of points or selections, each point or selection combining a plurality of electrical impulses of a negative and positive character, and a switch with means for adapting the receiving mechanism as a sending mechanism, and vice versa, said receiving mechanism having a series of shiftable contacts designed to be set so that a particular character may be electrically operated through a local receiving circuit, means to operate the shiftable contacts from the line circuit, and means to set the said contact so that a particular character may be electrically operated from a local receiving circuit.

7. In a telegraphic selective system, the combination of an operating key, a plurality of keyboard circuits controlled by said key, means by which on the depression of said key a plurality of said keyboard circuits are prepared, a single line circuit, a pair of telegraphic transmitters in said circuit, one of said transmitters closing and opening on the negative side of said line circuit, and the other of said transmitters opening and closing on the positive side of said line circuit, a series of magnets adapted to operate the negative transmitter, another series of magnets adapted to operate the positive transmitter, said keyboard circuits connected with said magnets, and means operated by the magnets for closing and opening said prepared circuits.

8. In a telegraphic selective system, the combination of an operating key, a plurality of keyboard circuits controlled by said key, means by which on the depression of said key a plurality of said keyboard circuits are prepared, a single line circuit, a pair of telegraphic transmitters in said circuit, one of said transmitters closing and opening on the negative side of said line circuit, and the other of said transmitters opening and closing on the positive side of said line circuit, a series of magnets adapted to operate the negative transmitter, another series of magnets adapted to operate the positive transmitter, said keyboard circuits connected with said magnets, and means operated by the magnets for closing and opening said prepared circuits, said last-named means including a plurality of switches corresponding in number to the number of prepared circuits.

9. In a telegraphic selective system, the combination of an operating key, a plurality of keyboard circuits controlled by said key, means by which on the depression of said key a plurality of said keyboard circuits are prepared simultaneously, a single line circuit, a pair of telegraphic transmitters in said circuit, one of said transmitters closing and opening on the negative side of said line circuit, and the other of said transmitters opening and closing on the positive side of said line circuit, a series of magnets adapted to operate the negative transmitter, another series of magnets adapted to operate the positive transmitter, said keyboard circuits connected with said magnets, and means operated by the magnets for closing and opening said prepared circuits successively.

10. In a telegraphic selective system, the combination of an operating key, a plurality of keyboard circuits controlled by said key, means by which on the depression of said key a plurality of said keyboard circuits are prepared, a line circuit, a pair of telegraphic transmitters in said circuit, one of said transmitters closing and opening on the negative side of said line circuit, and the other of said transmitters opening and closing on the positive side of said line circuit, a series of magnets adapted to operate the negative transmitter, another series of magnets adapted to operate the positive transmitter, said keyboard circuits connected with said magnets, means operated by the magnets for closing and opening said prepared circuits, and a receiving mechanism connected with the line circuit to receive the impulses emanating through said prepared keyboard circuits.

11. In a telegraphic selective system, the combination of an operating key, a plurality of keyboard circuits controlled by said key, means by which on the depression of said key a plurality of said keyboard circuits are prepared, a line circuit, a pair of telegraphic transmitters in said circuit, one of said transmitters closing and opening on the negative side of said line circuit, and the other of said transmitters opening and closing on the positive side of said line circuit, a series of magnets adapted to operate the negative transmitter, another series of magnets adapted to operate the positive transmitter, said keyboard circuits connected with said magnets, means operated by the magnets for closing and opening said prepared circuits, a receiving mechanism connected with the line circuit to receive the impulses emanating through said prepared keyboard circuits, and means by which the receiving mechanism is adapted to operate as a sending mechanism.

12. In a telegraphic selective system, the combination of an operating key, a plurality of keyboard circuits controlled by said key, means by which on the depression of said key a plurality of said keyboard circuits are prepared simultaneously, a line circuit, a pair of telegraphic transmitters in said circuit, one of said transmitters closing and opening on the negative side of said line circuit, and the other of said transmitters opening and closing on the positive side of said line circuit, a series of magnets adapted to operate the negative transmitter, another series of magnets adapted to operate the positive transmitter, said keyboard circuits connected with said magnets, means operated by the magnets for closing and opening said prepared circuits successively, and a receiving mechanism to receive the impulses over the line circuit and emanating from said prepared keyboard circuits.

13. In a telegraphic selective system, the combination of an operating key, a plurality of keyboard circuits controlled by said key, means by which on the depression of said key a plurality of said keyboard circuits are prepared simultaneously, a line circuit, a pair of telegraphic transmitters in said circuit, one of said transmitters closing and opening on the negative side of said line circuit, and the other of said transmitters opening and closing on the positive side of said line circuit, a series of magnets adapted to operate the negative transmitter, another series of magnets adapted to operate the positive transmitter, said keyboard circuits connected with said magnets, means operated by the magnets for closing and opening said prepared circuits successively, a receiving mechanism to receive the impulses over the line circuit and emanating from said prepared keyboard circuits, and means by which the receiving mechanism is adapted as a sending mechanism.

14. In a telegraphic selective system, the combination of an operating key, a plurality of keyboard circuits, switches in said circuits, means by which a key prepares a plurality of said keyboard circuits to be closed by said switches, means by which the switches of the prepared circuits are operated successively correspondingly to open and close successive of the said prepared keyboard circuits, a line circuit, and means by which the impulses resulting from the successive closing of said prepared keyboard circuits are communicated to the line circuit, said last-named means including a pair of telegraphic transmitters in the line circuit, one of said transmitters closing and opening on the negative side of said line circuit, and the other of the transmitters opening and closing on the positive side thereof.

15. In a telegraphic selective system, the combination of an operating key, a plurality of keyboard circuits, switches in said circuits, means by which a key prepares a plurality of said keyboard circuits to be closed by said switches, means by which the switches of the prepared circuits are operated successively correspondingly to open and close successive of the said prepared keyboard circuits, a line circuit, means by which the impulses resulting from the successive closing of said prepared keyboard circuits are communicated to the line circuit, said last-named means including a pair of telegraphic transmitters in the line circuit, one of said transmitters closing and opening on the negative side of said line circuit, and the other of the transmitters opening and closing on the positive side thereof, and means by which all of said impulses emanating from a set of said prepared circuits on the depression of the key operate the positive transmitter.

16. In a telegraphic selective system, the combination of an operating key, a plurality of keyboard circuits, switches in said circuits, means by which a key prepares a plurality of said keyboard circuits to be closed by said switches, means by which the switches of the prepared circuits are operated successively correspondingly to open and close successive of the said prepared keyboard circuits, a line circuit, means by which the impulses resulting from the successive closing of said prepared keyboard circuits are communicated to the line circuit, said last-named means including a pair of telegraphic transmitters in the line circuit, one of said transmitters closing and opening on the negative side of said line circuit, and the other of the transmitters opening and closing on the positive side thereof, and means by which all of said impulses emanating from a set of said prepared circuits on the depression of the key operate the negative transmitter.

17. In a telegraphic selective system, the combination of an operating key, a plurality of keyboard circuits, switches in said circuits, means by which a key prepares a plurality of said keyboard circuits to be closed by said switches, means by which the switches of the prepared circuits are operated successively correspondingly to open and close successive of the said prepared keyboard circuits, a line circuit, means by which the impulses resulting from the successive closing of said prepared keyboard circuits are communicated to the line circuit, said last-named means including a pair of telegraphic transmitters in the line circuit, one of said transmitters closing and opening on the negative side of said line circuit, and the other of the transmitters opening and closing on the positive side thereof, and means by which some of said impulses emanating from a set of said prepared circuits on the depression of the key operate the positive transmitter, and the others operate the negative transmitter.

18. In a telegraphic selective system, the combination with a sending key, a line circuit, and a receiving mechanism, of mechanism whereby on the single actuation of the key a group of impulses, part of which are negative, and part of which are of a positive character, are transmitted over the line circuit to the receiving mechanism, said receiving mechanism including rotatable disks provided with circuit closing means.

19. In a telegraphic selective system, the combination with a sending key, a line circuit, and a receiving mechanism, of mechanism whereby on the single actuation of the key a group of impulses, part of which are negative, and part of which are of a positive character, are transmitted over the line circuit to the receiving mechanism, said receiving mechanism including fixed and rotatable disks provided with circuit closing means.

20. In a telegraphic selective system, the combination with a sending key, a line circuit, and a receiving mechanism, of mechanism whereby on the single actuation of the key a group of impulses, part of which are negative, and part of which are of a positive character, are transmitted over the line circuit to the receiving mechanism, said receiving mechanism including rotatable disks provided with circuit closing means, and magnets energizable through the medium of the impulses received over the line circuit for operating said disks.

21. In a telegraphic selective system, a receiving mechanism including the combination with a line circuit, of a polarized relay therein, a pair of local circuits operated thereby, a plurality of magnets in the local circuit on the negative side of the relay, and a plurality of magnets in the circuit on the positive side of the relay, means for energizing and deënergizing these magnets successively, and signal operating circuits operable by said magnets.

22. In a telegraphic selective system, a receiving mechanism including the combination with a line circuit, of a polarized relay, a local circuit connected with the positive side of the relay, a local circuit connected with the negative side of the relay, a plurality of magnets arranged in parallel in each of said local circuits, signal operating circuits, and means operated by said magnets for opening and closing said signal operating circuits successively.

23. In a telegraphic selective system, a receiving mechanism including the combination with a line circuit, of a polarized relay, a local circuit connected with the positive side of the relay, a local circuit connected with the negative side of the relay, a plurality of magnets arranged in parallel in each of said local circuits, signal operating circuits, and means operated by said magnets for opening and closing said signal operating circuits successively, said last-named means including a series of rotatable circuit closing disks in the signal operating circuits.

24. In a telegraphic selective system, a receiving mechanism including the combination with a line circuit, of a polarized relay, a local circuit connected with the positive side of the relay, a local circuit connected with the negative side of the relay, a plurality of magnets arranged in parallel in each of said local circuits, signal operating circuits, and means operated by said magnets for opening and closing said signal operating circuits successively, said last-named means including switches having three sets of terminals, one set of said terminals connected with one pole of the negative side magnets, another set of said terminals connected with one pole of said positive side magnets, and the third or closing terminal acting conjointly with one or the other of said positive or negative side terminals on the energizing of corresponding negative or positive side magnets.

25. In a telegraphic selective system, a receiving mechanism including the combination with a line circuit, of a polarized relay, a local circuit connected with the positive side of the relay, a local circuit connected with the negative side of the relay, a plurality of magnets arranged in parallel in each of said local circuits, signal operating circuits, and means operated by said magnets for opening and closing said signal operating circuits successively, said last-named means including switches having three sets of terminals, one set of said terminals connected with one pole of the negative side magnets, another set of said terminals connected with one pole of said positive side magnets, and the third or closing terminal acting conjointly with one or the other of said positive or negative side terminals on the energizing of corresponding negative or positive side magnets, and means for changing said receiving mechanism to a sending mechanism.

26. In a telegraphic selective system, a sending mechanism comprising the combination with a line circuit, of a pair of telegraphic transmitters, one of said transmitters closing and opening the negative side of said line circuit, and the other of said transmitters closing and opening the positive side thereof, a sending key, a plurality of keyboard circuits controlled by said key, a plurality of magnets corresponding to the number of said circuits controlled by said key, part of said circuits and part of said magnets being arranged and connected to operate said negative side transmitter, and the other of said key-board circuits and said magnets to operate the positive side transmitter, and means by which on the operation of said key a number of said magnets greater than one, and less than the total number controlled by said key, are actuated.

27. In a telegraphic selective system, a sending mechanism comprising the combination with a line circuit, of a pair of telegraphic transmitters, one of said transmitters closing and opening the negative side of said line circuit, and the other of said transmitters closing and opening the positive side thereof, a sending key, a plurality of keyboard circuits controlled by said key, a plurality of magnets corresponding to the number of said circuits controlled by said key, part of said circuits and part of said magnets being arranged and connected to operate said negative side transmitter, and the other of said keyboard circuits and said magnets to operate the positive side transmitter, means by which on the operation of said key a number of said magnets greater than one, and less than the total number controlled by said key, are actuated successively, and means by which said transmitters are correspondingly actuated.

28. In a telegraphic selective system, a sending mechanism comprising the combination with a line circuit, of a pair of telegraphic transmitters, one of said transmitters closing and opening the negative side of said line circuit, and the other of said transmitters closing and opening the positive side thereof, a sending key, a plurality of keyboard circuits controlled by said key, a plurality of magnets corresponding to the number of said circuits controlled by said key, part of said circuits and part of said magnets being arranged and connected to operate said negative side transmitter, and the other of said keyboard circuits and said magnets to operate the positive side transmitter, means by which on the operation of said key a number of said magnets greater than one, and less than the total number controlled by said key, are actuated successively, means by which said transmitters are correspondingly actuated, and means including a switch by which said sending mechanism is adaptable as a receiving mechanism.

29. In a telegraphic selective system, a sending mechanism including the combination with a line circuit, of a pair of transmitters, one of said transmitters closing and opening a current of negative character in said circuit, and the other of said transmitters closing and opening a current of positive character in said circuit, a plurality of magnets corresponding to said negative side transmitter, and a plurality of magnets corresponding to said positive side transmitter, and mechanism for energizing said magnets and for operating them to transmit a selection of impulses of negative or positive character over said line circuit.

30. In a telegraphic selective system, a sending mechanism including the combination with a line circuit, of a pair of transmitters, one of said transmitters closing and opening a current of negative character in said circuit, and the other of said transmitters closing and opening a current of positive character in said circuit, a plurality of magnets corresponding to said negative side transmitter, and a plurality of magnets corresponding to said positive side transmitter, mechanism for energizing said magnets and for operating them to transmit a selection of impulses of negative or positive character over said line circuit, and means including a switch by which said sending mechanism is adapted as a receiving mechanism.

31. In a telegraphic selective system, a receiving mechanism comprising the combination with a sending key, of a plurality of keyboard circuits controlled by the key, a plurality of magnets each connected with a terminal of a corresponding keyboard circuit, switches in said keyboard circuits, said switches having one terminal connected with a corresponding pole of said magnets, means by which on the depression of a key said magnets operate to close successively a plurality of said switches, a line circuit, and means by which the impulses emanating from said closed keyboard circuits are communicated to the line circuit, said receiving mechanism having a series of shiftable contacts designed to be set so that a particular character may be electrically operated through a local receiving circuit, means to operate the shiftable contacts from the line circuit, and means to set the said contact so that a particular character may be electrically operated from a local receiving circuit.

32. In a telegraphic selective system, a receiving mechanism comprising the combination with a sending key, of a plurality of keyboard circuits controlled by the key, a plurality of magnets each connected with a terminal of a corresponding keyboard circuit, switches in said keyboard circuits, said switches having one terminal connected with a corresponding pole of said magnets, means by which on the depression of a key said magnets operate to close successively a plurality of said switches, a line circuit, and means by which the impulses emanating from said closed keyboard circuits are communicated to the line circuit, said keyboard switch operating means including a number of ratchets corresponding to the number of said circuits prepared to be closed on the depression of the key.

33. In a telegraphic selective system, the combination with a line circuit connected at each end with a polarized relay, of a local circuit at the sending end of the line, a local circuit at the receiving end operated by the relay at that end, means by which a selection comprising a plurality of impulses of negative or positive or negative and positive character is sent through the local circuit at the sending end and thence over the line circuit, and received by the local circuit at the receiving end of the line, and means for adapting the relay at the sending end to operate the sending local circuit as a receiving local circuit.

34. In a telegraphic selective system, the combination with a line circuit connecting with relays at its terminals, a local circuit at the sending end of the line, a local circuit at the receiving end of the line, means including a sending key for sending a selection comprising a plurality of impulses of negative or positive or negative and positive character through the local circuit at the sending end, and thence over the line circuit to be received by the local circuit at the receiving end of the line, and means for adapting the sending local circuit to operate as a receiving circuit or vice versa.

35. In a telegraphic selective system, the combination with a sending key, of a main line circuit, a receiving mechanism including two local circuits, a plurality of keyboard sending local circuits controlled by said sending key, means by which on the actuation of said key said keyboard circuits are prepared to allow currents to flow through them, auxiliary mechanism for closing said prepared circuits to energize respective of said local circuits, and means for adapting the sending local circuit to operate as a receiving circuit or vice versa.

36. In a telegraphic selective system, the combination with a sending key, of a main line circuit, two local sending circuits, a plurality of keyboard circuits controlled by said sending key, means by which on the actuation of said key certain of said keyboard circuits are prepared to allow currents to flow through them, auxiliary mechanism for closing said prepared circuits in succession to energize respective of said local circuits, said auxiliary mechanism electrically operated on the actuation of said key, and means for adapting the sending local circuit to operate as a receiving circuit or vice versa.

37. In a telegraphic selective system, the combination with a sending key, of a main line circuit, two local sending circuits, a plurality of keyboard circuits controlled by said sending key, means by which on the actuation of said key certain of said keyboard circuits are prepared to allow currents to flow through them, auxiliary mechanism for closing said prepared circuits to energize respective of said local circuits, said auxiliary mechanism electrically prepared on the actuation of said key, and means for adapting the sending local circuit to operate as a receiving circuit or vice versa.

38. A telegraphic selective mechanism comprising a series of parallel movable members, a series of contact blades on each of said members adapted to be moved into contact with the blades on an adjacent member by moving said members, means for moving alternate members in one direction by positive current impulses, and means for moving the other alternate members in the opposite direction by negative current impulses.

39. A telegraphic selective mechanism comprising a number of parallel movable members, means for moving every alternate member in one direction by a positive current impulse, means for moving the other intermediate members in the opposite direction by a negative current impulse, and a series of contact blades on each of said members adapted to travel into contact with the blades of the adjacent members.

40. A telegraphic selective mechanism comprising a number of parallel movable members, means for moving every alternate member in one direction by a positive current impulse, means for moving the other intermediate members in the opposite direction by a negative current impulse, and a series of contact blades on each of said members adapted to travel into contact with the blades of the adjacent members, said contact blades unequally spaced in relation to each other so that but a single line of contacting blades can be formed at one time.

41. A telegraphic selective mechanism comprising a number of parallel movable members, means for moving every alternate member in one direction by a positive current impulse, means for moving the other intermediate members in the opposite direction by a negative current impulse, a series of contact blades on each of said members adapted to travel into contact with the blades of the adjacent members, said contact blades unequally spaced in relation to each other so that but a single line of contact blades can be formed at one time, and a row of stationary contact blades on each side of the series of movable members adapted to contact the blades on the latter.

42. A permutation telegraphic selective device comprising a bank of contact members spaced unequal distances apart in rows of corresponding members, and means for moving each row of contact members collectively step by step by current impulses, alternate rows movable by positive current impulses in one direction and intermediate rows movable by negative current impulses in the opposite direction.

43. A permutation telegraphic selective device comprising a bank of contact members spaced unequal distances apart in rows of corresponding members, means for moving each row of contact members collectively step by step by current impulses, alternate rows movable by positive current impulses in one direction and intermediate rows movable by negative current impulses in the opposite direction, and stationary rows of contact members on each side of the movable rows, the contact members of one of said stationary rows being collectively electrically connected to a source of current supply, and the contact members of the other stationary row individually connected to distributing electrical conductors.

44. In a telegraphic selective system, the combination with a sending key, of a main line circuit, a receiving mechanism including two local circuits, a plurality of keyboard circuits controlled by said sending key, means by which on the actuation of said key said plurality of keyboard circuits are simultaneously prepared to allow currents to flow through them, mechanism for selecting groups of electric impulses as to their sign but intermediate as to time, length or strength, and auxiliary mechanism for successively closing said prepared circuits to energize respective of said circuits and for operating said selective mechanism.

45. In a telegraphic selective system, the combination with a sending key, of a main line circuit, a receiving mechanism including two local circuits, a plurality of keyboard circuits controlled by said sending key, means by which on the actuation of said key said plurality of keyboard circuits are simultaneously prepared to allow currents to flow through them, auxiliary mechanism for successively closing said prepared circuits to energize respective of said circuits, and means for adapting the sending local circuit to operate as a receiving circuit or vice versa.

In testimony whereof I have hereunto set my hand in the presence of two subscribing witnesses.

ADOLPH H. F. SCHAAR.

Witnesses:
CHARLES A. PENFIELD,
FRANK L. OWEN.